US012143654B2

(12) United States Patent
Hasan et al.

(10) Patent No.: US 12,143,654 B2
(45) Date of Patent: Nov. 12, 2024

(54) METHOD FOR DYNAMIC SELECTION OF A CONTENT DELIVERY NETWORK

(71) Applicant: Mux, Inc., San Francisco, CA (US)

(72) Inventors: Masroor Hasan, San Francisco, CA (US); Mark Franceschini, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

(21) Appl. No.: 18/097,014

(22) Filed: Jan. 13, 2023

(65) Prior Publication Data

US 2023/0224523 A1  Jul. 13, 2023

Related U.S. Application Data

(60) Provisional application No. 63/299,370, filed on Jan. 13, 2022.

(51) Int. Cl.
*H04N 21/24* (2011.01)
*H04N 21/2187* (2011.01)
*H04N 21/258* (2011.01)

(52) U.S. Cl.
CPC ..... *H04N 21/2402* (2013.01); *H04N 21/2187* (2013.01); *H04N 21/2408* (2013.01); *H04N 21/25841* (2013.01)

(58) Field of Classification Search
CPC .......... H04N 21/2402; H04N 21/2187; H04N 21/2408; H04N 21/25841; H04N 21/2401; H04N 21/64322; H04N 21/25808; H04L 65/612; H04L 65/80

USPC .......................................................... 709/231
See application file for complete search history.

(56) References Cited

U.S. PATENT DOCUMENTS

| | | | |
|---|---|---|---|
| 2012/0259946 A1* | 10/2012 | Stockhammer | ..... H04L 65/1045 709/217 |
| 2014/0109103 A1* | 4/2014 | Proffit | ..................... G06F 9/505 718/104 |
| 2015/0012658 A1* | 1/2015 | Elmore | .................. H04L 67/565 709/226 |
| 2020/0304868 A1* | 9/2020 | Ganjam | ........... H04N 21/44209 |

* cited by examiner

*Primary Examiner* — Tan Doan
(74) *Attorney, Agent, or Firm* — Run8 Patent Group, LLC; Peter Miller (57) ABSTRACT

A method includes, at a first time: receiving a request for video content from a first user; generating a fingerprint for the first user; associating the first user with a first user population—assigned to a first CDN and receiving the video content from the first CDN during the first time period—based on the fingerprint; and accessing a first metric for distribution of video content from the first CDN to users of the first user population. The method also includes, at a second time: selecting a second user within the first user population; identifying a second CDN distinct from the first CDN; reassigning the second user to the second CDN; and accessing a second metric for distribution of the video content from the second CDN to the second user; and, in response to the second metric exceeding the first metric, reassigning the first user to the second CDN.

7 Claims, 4 Drawing Sheets

METHOD FOR DYNAMIC SELECTION OF A CONTENT DELIVERY NETWORK

CROSS-REFERENCE TO RELATED APPLICATIONS

This Application claims the benefit of U.S. Provisional Application No. 63/299,370, filed on 13 Jan. 2022, which is incorporated in its entirety by this reference.

TECHNICAL FIELD

This invention relates generally to the field of internet communications and more specifically to a new and useful system and method for selection of a content delivery network in the field of internet communications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
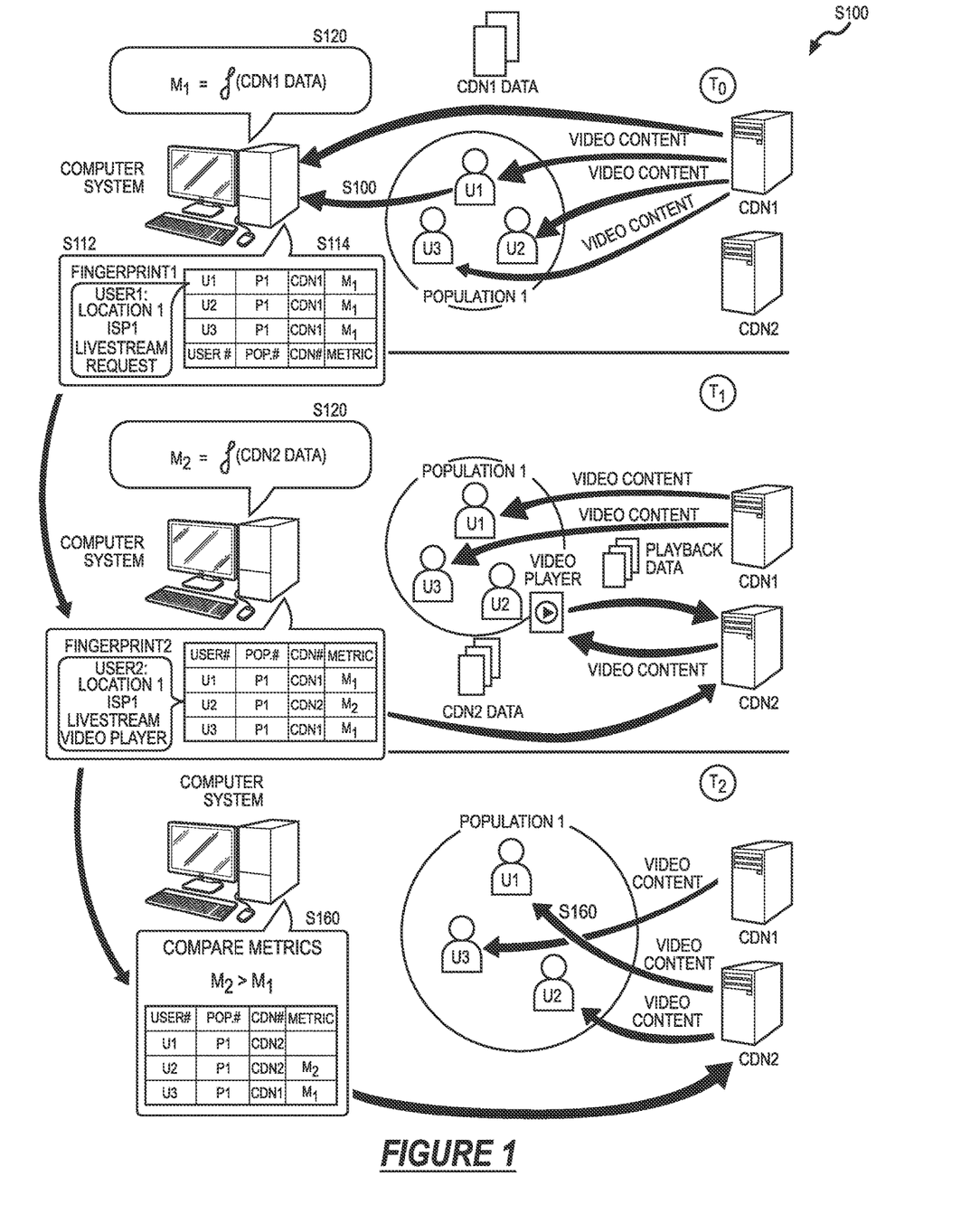
FIG. 1 is a flowchart representation of a method.

As shown in FIG. 1, a method S100 includes: at a first time within a first time period, receiving a first request for video content from a first user in Block S110, generating a first fingerprint for the first user in Block S112, associating the first user with a first user population based on the first fingerprint, the first user population assigned to a first content delivery network (CDN) and receiving the video content from the first CDN during the first time period in Block S114, and accessing a first metric for distribution of video content from the first CDN to users of the first user population in Block S120.

The first method S100 further includes, at a second time within the first time period, selecting a second user within the first user population in Block S130, identifying a second CDN distinct from the first CDN in Block S140, reassigning the second user to the second CDN in Block S150, and accessing a second metric for distribution of the video content from the second CDN to the second user in Block S120. Furthermore, the method S100 includes, in response to the second metric exceeding the first metric, reassigning the first user to the second CDN in Block S160.

1.1 First Variation: CDN Assignment Based on Historical Metrics

Figure 2:
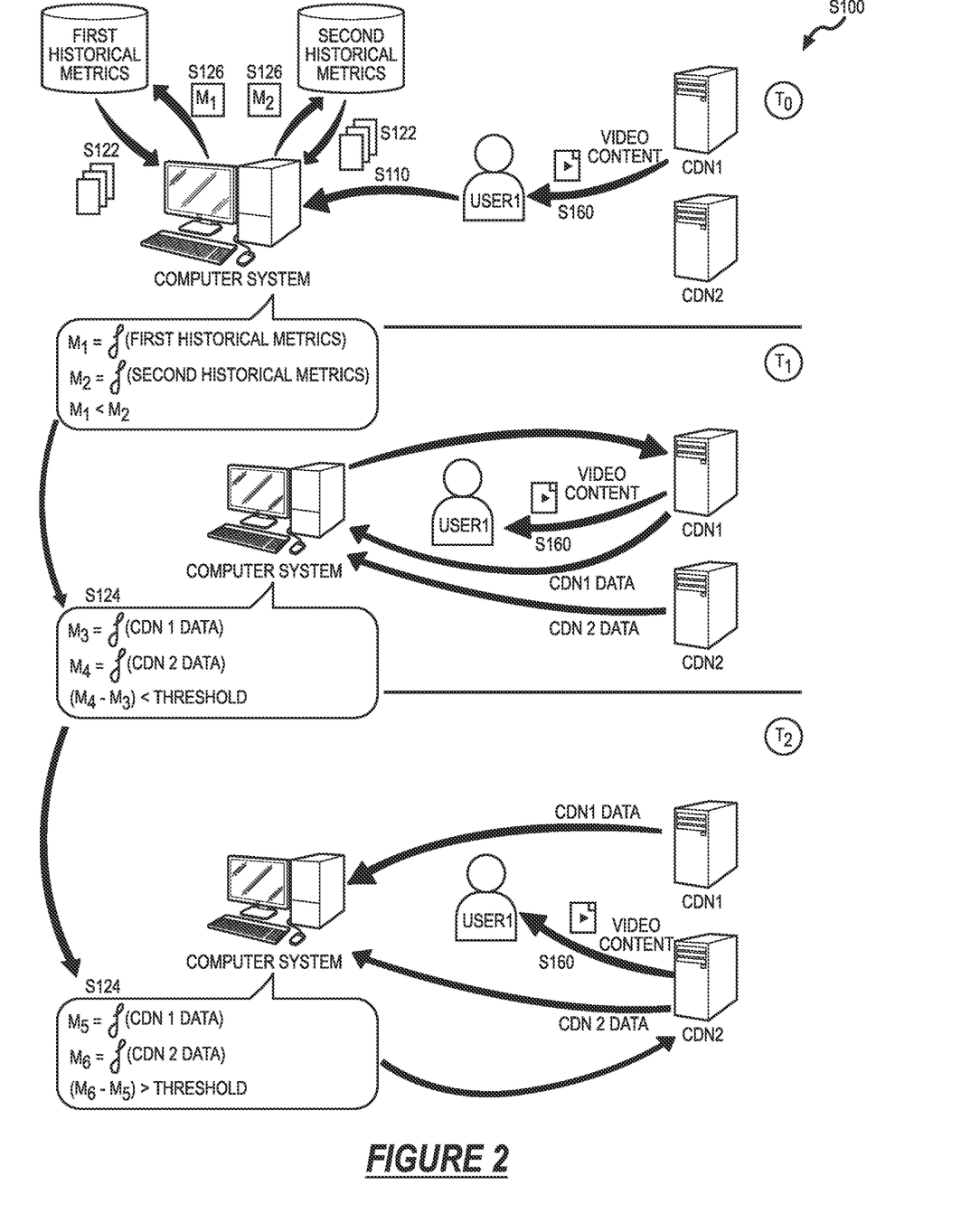
FIG. 2 is a schematic representation of a variation of the method.

As shown in FIG. 2, one variation of the method S100 includes: during the first time period, receiving a first request for video content from a first user in Block S110, generating a first fingerprint of the first user in Block S112, accessing first historical metrics for a first user population assigned to a first CDN in Block S122, and accessing second historical metrics for a second user population assigned to a second CDN in Block S122. Furthermore, this variation of the method S100 can include: based on the first historical metrics, calculating a first metric associated with distribution of the video content from the first CDN in Block S124, based on the second historical metrics, calculating a second metric associated with distribution of the video content from the second CDN in Block S124, updating the first historical metrics with the first metric and the second historical metrics with the second metric in Block S126 and, in response to the first metric exceeding the second metric, assigning the first user to the first CDN in Block S160.

This variation of the method S100 further includes: during a second time period, accessing a first data, from the first CDN, for distribution of the video content to the first user population during the first time period in Block S122; accessing a second data, from the second CDN, for distribution of the video content to the second user population during the first time period in Block S122; based on the first data, calculating a third metric associated with distribution of the video content from the first CDN prior to the second time period in Block S124; based on the second data, calculating a fourth metric associated with distribution of video content from the second CDN prior to the second time period in Block S124; and, in response to the fourth metric exceeding the third metric by more than a threshold difference, reassigning the first user to the second CDN in Block S160.

1.1.1 Second Variation: CDN Assignment Based on Device Characteristics

Figure 3:
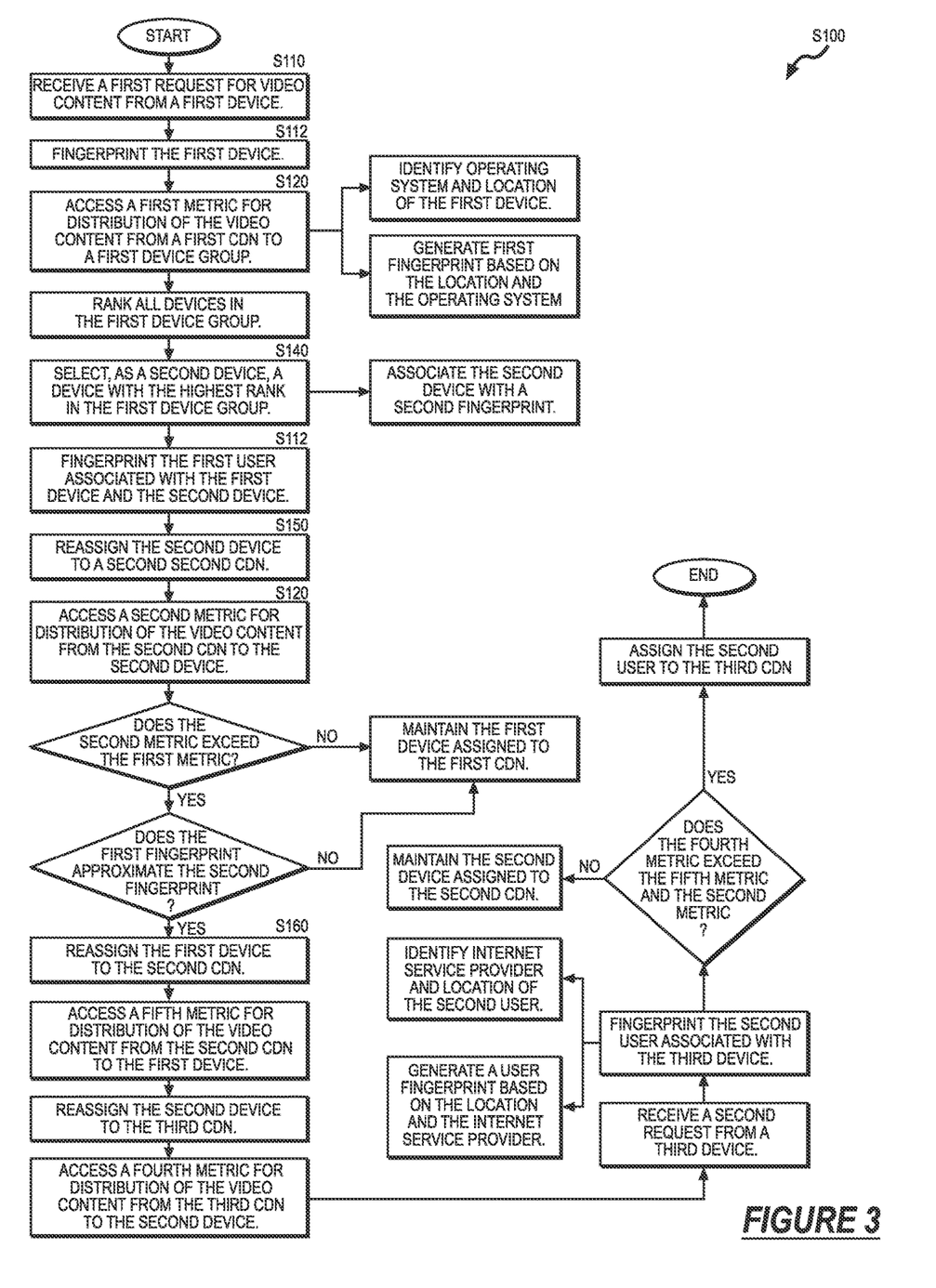
FIG. 3 is a flowchart representation of a variation of the method.

As shown in FIG. 3, another variation of the method S100 includes: at a first time within a first time period, receiving a first request for video content from a first device in Block S110, generating a first fingerprint for the first device based on a first location and a first characteristic of the first device in Block S112; associating the first device with a first set of devices based on the first fingerprint, the first set of devices assigned to a first CDN and receiving the video content from the first CDN during the first time period in Block S116; and accessing a first metric for distribution of video content from the first CDN to devices of the first set of devices in Block S120.

This variation of the method S100 further includes: at a second time within the first time period, selecting a second device, associated with a second fingerprint, within the first set of devices in Block S130; identifying a second CDN distinct from the first CDN in Block S140; reassigning the second device to the second CDN in Block S150, and accessing a second metric for distribution of the video content from the second CDN to the second device in Block S120. Furthermore, this variation of the method S100 further can include: in response to the second metric exceeding the first metric and, in response to the second fingerprint of the second device approximating the first fingerprint of the first device, reassigning the first device to the second CDN in Block S160.

1.2 Applications

Generally, the computer system can execute Blocks of method S100 to, at a first time: receive a request from a user for video content; receive CDN data (e.g., user IP addresses, latency, current usage numbers) from available CDNs at a first time; receive user information (e.g., the user geolocation) and, based on the CDN data, select a CDN that is expected to perform better than other CDNs when distributing the video content to the user. For example, selecting a CDN may include selecting a CDN that has historically performed well when delivering video content to users similar to the user (e.g., similar geolocation, operating system type). After the CDN has been selected, the computer system can assign the selected CDN to distribute the video content to the user. At a second time, the computer system can receive CDN data from available CDNs and, based on the CDN data and the user data, select a CDN (e.g., the CDN selected at a first time, or a new CDN out of available CDNS) that is expected to have the highest performance when distributing the video content to the user. The computer system can then reassign the user to the newly selected CDN, or maintain the user assigned to the CDN selected at a first time. Therefore, the computer system can dynamically assign users to available CDNs and ensure high video content quality for the users.

Further, the computer system can execute Blocks of method S100 to: receive a request from the first user; and, prior to reassigning the first user from a first CDN to a second CDN, test the second CDN by assigning a second user to the second CDN. More specifically, the computer system can: select as the second user a user having similar characteristics to the first user; reassign the second user to the second CDN; and, based on CDN data received from the first CDN and the second CDN, compare the video quality of the users assigned to the first CDN with the video on the second user assigned to the second CDN. Based on the comparison, the computer system can reassign the first user to the second CDN or maintain the first user at the first CDN. Therefore, the computer system can assess the CDN performance and compare different available CDNs to determine whether to reassign new users.

Generally, the method S100 is described herein as executed by the computer system to dynamically assign a CDN—from a set of available CDNs—to a user streaming video content, such as to a mobile device, laptop, or desktop computer. However, the method S100 can additionally or alternatively be implemented by the computer system to selectively assign a CDN—from the set of available CDNs—to a user streaming audio or another type of digital content (e.g., images, HTML pages, files) to the mobile device, laptop, or desktop computer, etc.

1.3. Terms and Definitions

A CDN is referred to herein as a server configured to distribute digital content (e.g., video content) to the users via the internet. Generally, a geographically-distributed network of multiple CDNs can distribute video content to users throughout the world with minimal delay. The CDN can measure its own performance, uptime, downtime, throughput, and/or latency and provide this information as CDN data (e.g., CDN log data).

A user is referred to herein as a consumer of the video content. The user may request video content from a video streaming service, and once received, may view the video content on a device. The user may have several devices associated with one user account.

A device is referred to herein as an electronic equipment configured to play the video content. In particular, the device can include a media player configured to interact with the CDN and receive the video content. Furthermore, the device may be configured to provide video playback data and device information via the video player. The device can be associated with a particular user if, for example, the device stores credentials to a user account of the user.

1.4. First User Identification

The method S100 includes: receiving a first request for video content from a first user in Block S110; generating a first fingerprint for the first user in Block S112; and associating the first user with a first user population based on the first fingerprint in Block S114, wherein the first user population is assigned to a first CDN and receives the video content from the first CDN during the first time period.

Generally, in Blocks S110, S112, and S114, the computer system can: receive a request for video content from the first user; identify the first user (e.g., based on a set of characteristics); and associate the first user with a group of users (e.g., users that share the set of characteristics) and receive the video content from a first CDN. For example, upon receiving the request for the video content from the first user, the computer system can identify the geolocation of the first user and associate the first user with a group (e.g., population) of users located in the same location as the first user and receiving video content from a particular CDN. Therefore, the computer system can associate a user with a CDN based on a population of similar users being assigned to the CDN.

1.4.1 Variation: First Device Identification

One variation of the method S100 includes: receiving a first request for video content from a first device in Block S110; generating a first fingerprint for the first device based on a first location and a first characteristic of the first device in Block 112; and associating the first device with a first set of devices based on the first fingerprint in Block 114, the first set of devices assigned to a first CDN and receiving the video content from the first CDN during the first time period. Generally, in Blocks S110, S112, and S114, the computer system can: receive a request for the video content from a device; identify the device based on the location of the device and a device characteristic (e.g., operating system type); and associate the device with the first set of devices having the same location and characteristic. Therefore, the computer system can associate a device with a CDN based on a set of similar devices being assigned to the CDN.

1.4.2 First User Request

In one implementation, the computer system can receive the first request for video content from a first user. More specifically, the computer system can receive a request to stream video from an origin server via the CDN. For example, the computer system can receive the request from the video player associated with the user. In one implementation, the computer system can receive the first request for video content from a first device (e.g., a device associated with the first user).

1.4.3 First User Fingerprint

In one implementation, the computer system can generate the first fingerprint based on the internet service provider (ISP) of the first user, geolocation of the first user, and request type (e.g., livestream request, stored video request)

of the first user. For example, the computer system can: identify a first internet service provider (ISP) of the first user as a first ISP, identify a first geolocation of the first user as a first geographic region; identify the first request as a request for livestream video; and generate the first fingerprint corresponding to the first internet service provider, the first geolocation, and the request for livestream video.

In one implementation, the computer system can generate the first fingerprint based on the geolocation of the first device, and a characteristic of the first device. For example, the computer system can: identify the operating system of the first device (e.g., as an iOS operating system); identify a first geolocation of the first user as a first geographic region; and generate the first fingerprint based on the first operating system, and the first geolocation.

Generally, the computer system can generate the first fingerprint for the first user based on any number of characteristics (e.g., geolocation, ISP, request type, type of video player, type of operating system of a device associated with the user) attributable to the first user. Based on the fingerprint, the computer system may associate the first user with a population of users (e.g., first user population) that have the same fingerprint as the first user. Furthermore, the computer system can generate more than one fingerprint for the first user. For example, the computer system can generate: a first fingerprint based on the geolocation and ISP of the user; and a second fingerprint based on the request type and ISP of the user. Similarly, the computer system can generate one or more fingerprints for a device and, based on the fingerprints, associate the device with one or more sets of devices accordingly.

1.4.4 First User-CDN Assignment

In one implementation, the computer system can associate the first user with a first user population and assign the first user to a first CDN based on the ISP of the first user, the geolocation of the first user, and the request type (e.g., request for livestream, request for pre-recorded video) of the first user, which may be associated with a particular fingerprint and a particular user population. More specifically, the computer system can generate a first fingerprint for the first user and assign a first user to a first CDN by, based on the first fingerprint, associating the first user with a first user population, the first user population assigned to a first content delivery network (CDN) and receiving the video content from the first CDN during the first time period. For example, the computer system can associate the first user with the first user population based on the first user having a first ISP (e.g., T-Mobile), a geolocation within the first geographic region (e.g., Phoenix metropolitan area), and based on the first request being a request for a livestream video, which are signatures of the first fingerprint.

1.5 Evaluation of First User-CDN Assignment

Block S120 of the method S100 recites: accessing a first metric for distribution of video content from the first CDN to users within the first user population. Generally, in Block S120, the computer system can evaluate the streaming quality of the video content delivered by the first CDN to the first user population. More specifically, in Block S120, the computer system can access a first metric, which quantifies the quality of the video content distributed by the fist CDN to the users within the first user population. In other words, the computer system can assess a match between the first CDN and the users within the first user population (e.g., the first user) based on the quality of the video content distributed by the first CDN to the users within the first user population. Therefore, by comparing the first metric with other metrics (e.g., second metric, third metric), the computer system can compare the match between the first CDN and the users of the first user populations with matches between other available CDNs and users. Based on the comparison, the computer system can reassign a user of the first user population from the first CDN to another CDN (e.g., a CDN with the best match to the users of the first user population) to improve the quality of the video content requested by the user.

1.5.1 One Variation: Evaluation of the First Device-CDN Assignment

Block S120 of the method S100 recites: accessing a first metric for distribution of video content from the first CDN to devices within the first set of devices. Generally, in Block S120, the computer system can evaluate the streaming quality of the video content delivered by the first CDN to the first set of devices. Therefore, the computer system can compare the first CDN to other available CDNs based on the quality of the video content distributed to the first set of devices by a first CDN and other available CDNs and, based on the comparison, reassign a device of the first set of devices (e.g., the first device) from the first CDN to another CDN.

1.5.2 Metrics

In one implementation, the computer system can access the first metric for the first user population based on an error rate, a buffer fill rate, and a bitrate of the first video content distributed from the first CDN to the users within the first user population. In particular, the computer system can, for each user within the first user population: access a first error rate of the video content distributed from the first CDN during the first time period; access a first buffer fill rate of the video content distributed from the first CDN during the first time period; and access a first bitrate of the video content distributed from the first CDN during the first time period. Further, the computer system can: average the first error rate, first buffer fill rate, and first bitrate across all users in the first user population; and calculate the first metric based on a combination of the averaged first error rate, the averaged first buffer fill rate, and the averaged first bitrate.

In another implementation, the computer system can access the first metric for distribution of the video content form the first CDN to users within the first user population based on data from the first CDN, which includes latency of the first CDN during the first time period and buffer time associated with the first CDN during the first time period. For example, the computer system can access first data, from the first CDN, for distribution of the video content to the first user population during the first time period, the first data including: latency of the first CDN during the first time period; and buffer time associated with the first CDN during the first time period. Then, based on the first data, the computer system can derive the first metric for the first user population, the first metric associated with a quality of the video content distributed by the first CDN to the first user population.

Generally, the first metric can be based on a variety of different indicators of the video playback quality including, but not limited to, the bitrate, buffer fill rate, and latency. In one implementation, the computer system can access the first metric directly from the CDN data. Additionally, or alternatively, the computer system accesses several indicators of the playback quality and, based on the accessed indicators, calculates the first metric.

1.6 Second User Testing

Blocks S130, S140, and S150 of the fist method S100 recite: selecting a second user within the first user population in Block S130; identifying a second CDN distinct from the first CDN in Block S140; and reassigning the second user to the second CDN in Block S150. Generally, in Blocks S130, S140, and S150, the computer system can: identify a second user (e.g., a user within the first user population other than the second user) receiving the video content from the first CDN; identify a second CDN (e.g., a CDN distinct from the first CDN) that can provide the video content to the users within the first population; and reassign the second user to the second CDN such that the second user starts receiving the video content via the second CDN. By assigning the second user to the second CDN, the computer system can test the quality of the video content delivered by the second CDN and determine whether to assign more users to the second CDN.

1.6.1 One Variation: Second Device Testing

Blocks S130, S140, and S150 of the fist method S100 recite: at a second time within the first time period, selecting a second device associated with a second fingerprint within the first set of devices; identifying a second CDN distinct from the first CDN; and reassigning the second device to the second CDN. Generally, in Blocks S130, S140, and S150, the computer system can: identify a device that is receiving the video content from the first CDN; identify a second CDN that can provide the video content to the set of devices; and reassign the second device to the second CDN such that the second device begins receiving the video content via the second CDN. By assigning the second device to the second CDN, the computer system can test the quality of the video content delivered by the second CDN and determine whether to assign more devices to the second CDN.

1.6.2 Second Device/User-CDN Assignment Triggers

In one implementation, the computer system can reassign the second user to the second CDN in response to a size of the first user population exceeding a threshold size. For example, the computer system can assist in delivering a live sports broadcast to a large live online viewership. If a number of users served by the first CDN exceeds a threshold quantity, the computer system can assign one of the users streaming the sports broadcast from the first CDN to a different CDN (e.g., CDN not close to usage capacity).

In one implementation, the computer system can reassign the second user to the second CDN in response the error rate in the video content streamed by one or more users within the first user population exceeding a threshold error rate. For example, the computer system can receive an indication that the video content delivered by the first CDN to the first user is exhibiting interruptions, buffering, etc. The computer system can then test an alternative CDN by assigning the second user to the alternative CDN if the error rate exceeds the threshold error rate.

In one implementation, the computer system may trigger reassignment of the second user to the second CDN based on a target quantity (e.g., metric) exceeding or falling below threshold. For example, the computer system can, at the second time within the first time period: access a first metric for distribution of the video content from the first CDN to the second user; and reassign the second user to the second CDN in response to the first metric for the distribution of the video content from the first CDN to the second user falling below a threshold. In another example, the computer system can reassign the second user to the second CDN in response to the latency of the first CDN exceeding a threshold latency.

Generally, the computer system can dynamically reallocate users from a first CDN to a second CDN based on factors like the amount of traffic supported by each CDN, error rate associated with the video playback, and metrics accessed or derived by the computer system from the CDN data. The dynamic allocation of users enables the computer system to maintain video playback quality for the first user population that receives the video content from the first CDN and maintain (or improve) the video playback quality for the users (e.g., first user, second user) moved to second CDN.

1.6.3 Second User Selection

In one implementation, the computer system can select the second user to reassign to the second CDN based on the geolocation of the second user and/or the subpopulation to which the second user belongs. For example, the computer system can: segment a population of users in a city into an eastern subpopulation and a western subpopulation; identify a second CDN; and select a user from the Western subpopulation to reassign to the second CDN. By reassigning the user from the Western subpopulation to the second CDN, the computer system can test the effect of moving the Western subpopulation to the second CDN.

In one implementation, the computer system can select, as the second user (e.g., the user to be reassigned to a new CDN), a user having a high playback quality (e.g., high bitrate, low error rate) of streamed video content distributed by the first CDN (e.g., current CDN). More specifically, the computer system may rank all users in the first population based on data from the first CDN and select, as the second user, the user with the highest rank. For example, the computer system can: access first data, from the first CDN, for distribution of the streamed video content to each user in the first user population; and, based on the first data, calculate a score for each user in the first user population. The computer system can then: generate a ranking wherein the users of the first user population are arranged according to the score of each user; and select, as the second user, a user with the highest score based on the ranking.

In one implementation, the computer system can select the second user based on the second user having a particular fingerprint. For example, the computer system may receive a second request for streamed video content from the second user and generate a second fingerprint for the second user, which includes, for example: identifying the geolocation of the second user as a subregion within a first region; and identifying the second request as coming from a user device with a first operating system. The computer system may then select the second user within the first user population based on determining: that the second request for the streamed video content from the second user is generated by a video player configured to capture and provide playback metrics; and that the secondary fingerprint is representative of a subpopulation (e.g., subpopulation of users associated with the video player) of the first user population. Therefore, the computer system can select, as the second user, a user that can provide detailed playback metrics of the streamed video content received from the second CDN, which will enable the computer system to determine whether assigning the second user to the second CDN has improved the quality of the streamed video content. If the quality of the streamed video content has improved, the computer system can assign additional users from the subpopulation to the second CDN. For example, the computer system can: receive the playback metrics from the video plyer associated with the second user; and, based on the playback metrics indicating that a playback quality exceeds a threshold, assign additional users from the subpopulation to the second CDN.

In one implementation, the computer system can select, as a second user, a user from a subpopulation with a highest projected metric. More specifically, the computer system can predict a first metric for a first subpopulation (e.g., subpopulation associated with the second fingerprint) and a second metric for a second subpopulation (e.g., subpopulation associated with a third fingerprint) based on historical metrics of two subpopulations and select the second user from within the subpopulation having a higher predicted metric.

1.6.4 Second CDN Identification

In one implementation, the computer system can identify a second CDN based on the second CDN having the capacity to deliver the requested video content to the users within the first user population. If many such CDNs are available, the computer system can select the second CDN based on factors like capacity (e.g., number of users that can be supported by a CDN) of the CDN, current usage (e.g., number of users currently assigned), current error rate of the content delivered by the CDN, and current latency of the CDN. For example, out of a set of five CDNs that can deliver video content to the users within the first user population, the computer system can select the CDN that has a low latency, distributes video content with low error rate, and is operating at a small fraction of its capacity.

In one implementation, the computer system can simultaneously select for testing two different CDNs. For example, in addition to selecting the second CDN, the computer system can: identify a third CDN (e.g., a CDN distinct from the first CDN and the second CDN); reassign a third user to the third CDN; and access a third metric for distribution of the video content from the third CDN to the third user. Then, for example, in response to the third metric falling below the first metric (e.g., metric associated with the first CDN), the computer system may reassign the third user to the first CDN.

1.7 Evaluation of Second User-CDN Assignment

Block S120 of the method S100 recites: accessing a second metric for distribution of video content from the second CDN to the second user. Generally, in Block S120, the computer system can assess information about the streaming quality of the video content delivered by the second CDN to the second user. More specifically, in Block S120, the computer system can access a second metric, which quantifies the quality of the video content distributed by the second CDN to the second user. In other words, the computer system can assess a match between the second CDN and the second user, representative of the first user population, based on the quality of the video content distributed by the first CDN to the second user. Therefore, by comparing the second metric with the first metric, the computer system can compare the match between the second CDN and the users of the first user population with a match between the first CDNs and users of the first user population. Based on the comparison, the computer system can reassign users of the first user population from the first CDN to the second CDN.

1.7.1 One Variation: Evaluation of Second Device-CDN Assignment

Block S120 of the method S100 recites accessing a second metric for distribution of the video content from the second CDN to the second device. Generally, in Block S120, the computer system can assess information about the streaming quality of the video content delivered by the second CDN to the second device. More specifically, in Block S120, the computer system can access a second metric, which quantifies the quality of the video content distributed by the second CDN to the second device. This enables the computer system to compare CDNs and, based on the comparison, reassign users from the first user population to the CDN associated with the higher metric.

1.7.2 Metrics

In one implementation, the computer system can evaluate the second metric for the second user based on an error rate, buffer fill rate, and/or bitrate of the video content distributed from the second CDN to the second user. For example, the computer system can access: an error rate of the video content distributed from the second CDN to the second user during the second time period; a buffer fill rate of the video content distributed from the second CDN during the second time period; and a second bitrate of the video content distributed from the second CDN during the second time period. Further, the computer system can calculate the second metric based on a combination of this error rate, this buffer fill rate, and/or this bitrate.

In another implementation, the computer system can assess the second metric for distribution of the video content from the second CDN to the second user based on data from the second CDN, which includes latency of the second CDN during the second time period and buffer time associated with the second CDN during the second time period. For example, the computer system can access second data, from the second CDN, for distribution of the video content to the second user during the second time period, the second data comprising: latency of the second CDN during the second time period and buffer time associated with the second CDN during the second time period. Then, based on the second data, the computer system can derive the second metric for the second user, the second metric associated with a second quality of the video content for the second user.

1.8 User-CDN Reassignment Based on Test Results

Block S160 of the method S100 recites, in response to the second metric exceeding the first metric, reassigning the first user to the second CDN. Generally, in Block S160, the computer system can reassign a new user from within the first user population to the second CDN in response to an indication that the quality of the video content distributed by the second CDN exceeds the quality of video content distributed by the first CDN. Therefore, the computer system can dynamically reassign users in real time to a CDN that is expected to provide video content with higher quality than the CDN to which the user is currently assigned.

1.8.1 One Variation: Device-CDN Reassignment

One variation of the Block S160 of the method S100 recites, in response to the second metric exceeding the first metric and in response to the second fingerprint of the second device approximating the first fingerprint of the first device: reassigning the first device to the second CDN. Generally, in Block S160, the computer system can reassign a first device of the first set of devices from the first CDN to the second CDN in response to an indication that the quality of the video content distributed by the second CDN exceeds the quality of the video content distributed by the first CDN. Therefore, the computer system can dynamically reassign devices in real time to a CDN that is expected to provide the video content with a higher quality than the CDN to which the user is currently assigned.

In one implementation, the computer system can reassign a first device—from the first set of devices—from the first CDN to the second CDN in response to an indication that the device associated with evaluation of the second CDN (e.g., the source of data for the second metric) is similar to the first device, such as in response to the second fingerprint of the second device approximating the first fingerprint of the first device. For example, the computer system can generate the second fingerprint for the second device and a first fingerprint for the first device: the second fingerprint indicating that the second device has a first type of operating system, is located in a first geographic region, and uses a second internet service provider (ISP); and the first fingerprint indicating that the first device has the first type of operating system, is located in the first geographic region, and uses a first ISP. Because the first device and the second device share the same geographic region and operating system type, the computer system can reassign the first device based on the comparison between the second metric (e.g., metric associated with the second device) and the first metric.

1.8.2 Reassignment Conditions

In one implementation, in response to an indication that the second CDN is associated with a higher playback metric than the first CDN, the computer system can reassign the first user to the second CDN based on the first user not having a capability to provide playback metrics via a video player (e.g., as opposed to the second user that can provide playback metrics via the video player). For example, the computer system can reassign the first user to the second CDN based on the first user not including the video player configured to capture and provide the playback metrics.

In a similar implementation, the computer system can reassign the first user to the second CDN in response to the second quality of the video content streamed by the second user exceeding the first quality of the video content streamed by the first user, the second quality related to the second metric that is derived from the second data (e.g., data from the second CDN), and the first quality related to the first metric that is derived for the first data (e.g., data from the first CDN).

In another implementation, the computer system can: calculate a score associated with the second CDN for each user in the first user population; select, as the second user, a user with the highest score for the second CDN; assign the second user to the second CDN; and, if the second metric exceeds the first metric, reassign the first user to the first CDN based on the first user having a next highest score for the second CDN after the second user.

In another implementation, the computer system can, in addition to reassigning the first user to the second CDN during a first time period reassign a third user to the second CDN based on the quality of video content distributed by the second CDN to the first user during the second time period after the first time period. For example, the computer system can, after reassigning the first user to the second CDN at a second time period, at a first time within the third time period: select a third user (e.g., a new user) within the first user population; access a third metric for distribution of the video content from the second CDN to the first user; and access a fourth metric for distribution of the video content from the first CDN to the first user population. Based on the third metric exceeding the fourth metric, the computer system can reassign the third user to the second CDN. Furthermore, the computer system can reverse user reassignment if the most current metrics indicate a decline in quality of the video content distributed by the second CDN. For example, the computer system can, at a second time within a third time period, access a fifth metric for distribution of the video content from the second CDN to the third user and, in response to the fifth metric falling below the fourth metric (e.g., metric for distribution of the video content from the first CDN users of the first user population during), reassign the third user to the first CDN.

In another implementation, the computer system can reassign the first user to a second CDN in response to the metric associated with a device assigned to the second CDN exceeding two metrics associated with a user (e.g., a user who has two devices) assigned to the first CDN. For example, the computer system can, at a first time: access a third metric for distribution of the video content from the first CDN to the second device; reassign the second device to a second CDN; and, at a second time, access a fourth metric for distribution of the video content from the second CDN to the second device, access a fifth metric for distribution of the video content from the first CDN to the first device, select a third device within the first set of devices, and fingerprint a first user associated with the third device. Then, in response to fourth metric exceeding the fifth metric and the third metric, the computer system can reassign the first user to the second CDN.

1.8.3 User-CDN Reassignment Based on Threshold Difference

In an embodiment, the computer system can reassign a user to a CDN based on a metric exceeding or falling below a threshold difference. More specifically, the computer system can: at a first time, assign the first user to a first CDN in response to the first metric (e.g., metric associated with distribution of the video content from the first CDN to the first user) exceeding the second metric (e.g., metric associated with distribution of the video content from the second CDN to the first user); and, at a second time, reassign the first user to the second CDN in response to a fourth metric exceeding a third metric by more than a threshold difference.

Blocks S122 and S124 of one variation of the method S100 recite, during a first time period: accessing first historical metrics for a first user population assigned to a first CDN in Block S122; accessing second historical metrics for a second user population assigned to second CDN in Block S122; based on the first historical metrics, calculating a first metric associated with distribution of the video content from the first CDN in Block 124; and, based on the second historical metrics, calculating a second metric associated with distribution of the video content from the second CDN in Block S124. Generally, in Blocks 122 and S124, the computer system can, based on historical metrics (e.g., metrics previously calculated and recorded by the computer system) predict the quality of video content delivered via the first CDN and the second CDN respectively. Therefore, the computer system can compare the predicted quality of video content delivered to various users via the first CDN and the second CDN and, based on the comparison, assign the first user to the CDN that is expected by provide higher quality video content based on historical performance. In one implementation, in response to the first metric exceeding the second metric, the computer system can assign the first user to the first CDN.

Blocks S122, S124, and S126 of a variation of the method S100 further recite: during a second time period, accessing first data, from the first CDN, for distribution of the video content to the first user population during the first time period in Block S122; accessing second data, from the second CDN, for distribution of the video content to the second user population during the first time period in Block S122; based on the first data, calculating a third metric associated with the first user streaming the video content from the first CDN in Block S124; based on the second data, calculating a fourth metric associated with the first user streaming the video content from the second CDN in Block S124; and adding the third metric to the first historical metrics and the fourth metric to the second historical metrics in Block S126. Generally, in Blocks 122 and S124, the computer system can, based on recently collected CDN data, evaluate the quality of video content delivered to the first user population via the first CDN and the quality of video content delivered to the second user population (e.g., the user population assigned to the second CDN) via the second CDN during the first time period. Generally, in Block 126, the computer system can: store the calculated metrics (e.g., in computer memory); and later retrieve and implement these stored metrics (e.g., first historical metrics, second historical metrics) to predict video content quality delivered by a particular CDN when CDN data from this particular CDN is not available. By calculating the third metric and the fourth metric, the computer system can: compare the quality of video content delivered via the first CDN and via the second CDN during the second time period; and, based on the comparison, reassign the first user to the CDN that is expected by provide a higher quality video content during the second time period.

In one implementation, to ensure that only significant differences in quality between video content provided by the current CDN (e.g., first CDN) and the candidate CDN (e.g., second CDN) result in user reassignment, the computer system can reassign the user to a new CDN only if the quality difference between the current CDN and a candidate CDN exceeds a threshold. For example, the computer system can, during a second time period, reassign the first user from the first CDN to the second CDN in response to the fourth metric exceeding the third metric by more than a threshold difference. Meanwhile, during an intermediate time period between the first time period and the second time period, the computer system can maintain the first user at the first CDN in response to a sixth metric (e.g., metric associated with the video content delivered by the second CDN) exceeding a fifth metric (metric associated with the video content delivered by a first CDN) by less than the threshold difference.

In one implementation, the computer system can trigger calculation of the metrics in response to a variety of conditions including time (e.g., time elapsed since the metrics have been last calculated) exceeding a threshold duration, stream error rate (e.g., rate errors within the video content) increase, and latency of the currently assigned CDN increase. For example, the computer system can calculate the third metric in response to: receiving an indication of a time elapsed from the last metric calculation event exceeding a threshold duration, and/or receiving an indication of an increase in streaming error rate within the video content streamed by the first user and receiving an indication of a latency increase of the first CDN.

2. Variation

As shown in FIG. 1, one variation of the method S100 for selection of a content delivery network (CDN) S100 includes: by a computer system 100, generating a CDN log including distribution data from a CDN within a set of CDNs; by the computer system 100, accessing a streaming performance data set; by the computer system 100, augmenting the CDN log with the streaming performance data set to generate an enhanced CDN log; and, by the computer system 100, receiving a request from a user device to stream video from the computer system 100 to the user device via the CDN. As shown in FIG. 1, the method S100 can also include: by the computer system 100, associating an autonomous system number (ASN) with the user device defining a geographical location of the user device; by the computer system 100, accessing the augmented CDN log to determine a lowest latency CDN in the set of CDNs; and, by the computer system 100, transmitting a URL associated with the lowest latency CDN to the user device One variation of the method S100 can further include: by the computer system 100, transmitting a ranked list of CDNs to the user device such that the user device can autonomously select a lowest latency CDN in response to changes in the latency of the CDNs identified in the ranked list of the CDNs.

2.1 Architecture

Figure 4:
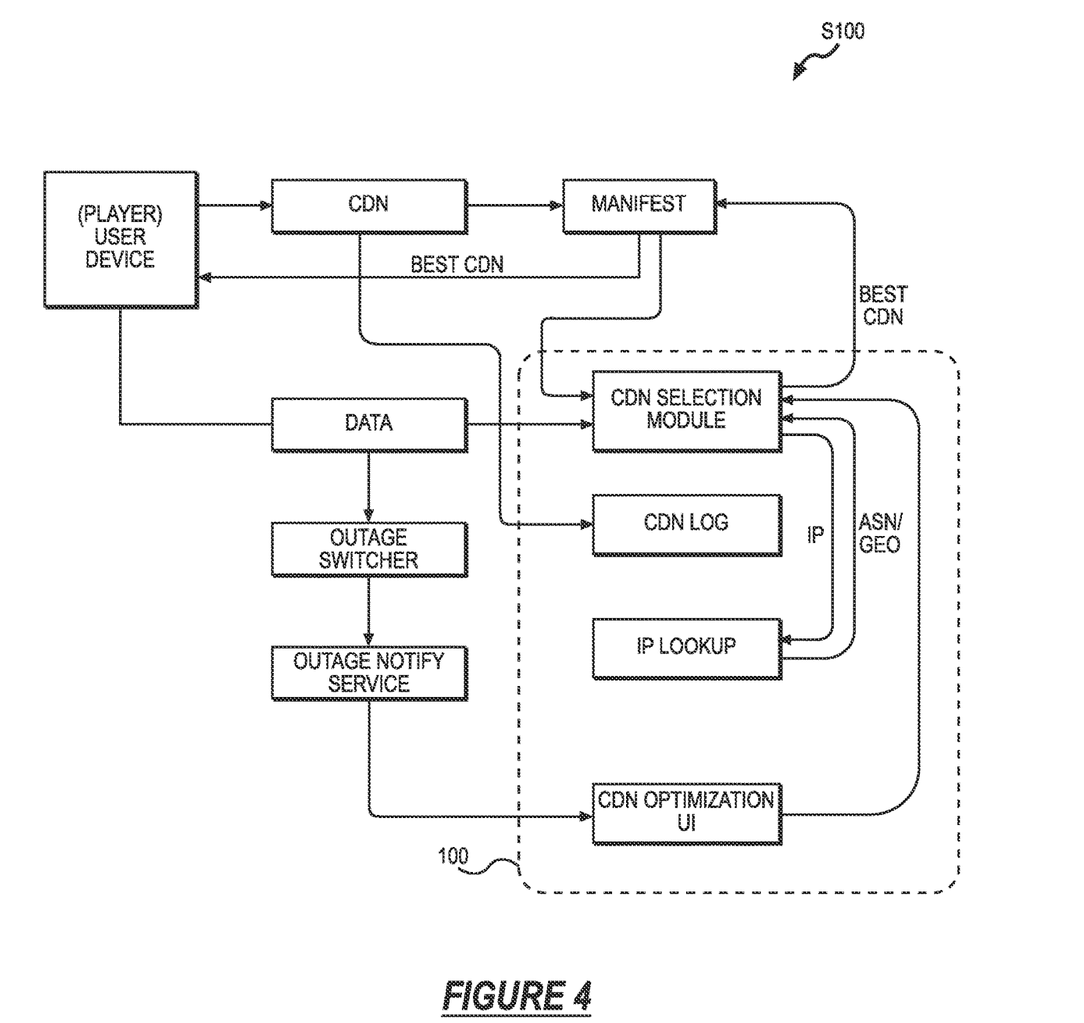
FIG. 4 is a schematic representation of a system architecture.

Generally, the computer system 100 can be implemented within a system architecture as shown in FIG. 4. The computer system 100 (e.g., a set of computers, network of servers, local/remote proxy servers, databases, etcetera) can be configured to access, receive, ingest, configure, and/or store AV segments, for example including portions of digital video data. The computer system 100 can include and/or be connected a set of CDNs that are internet-facing and associated with and/or configured to be associated with one or more URL addresses. Generally, the CDNs function to distribute various types of digital content (including digital AV segments) to internet users throughout the world.

As shown in FIG. 4, the computer system 100 can generally include and/or be in communication with a CDN log database or dataset (described below) that includes performance data for a set of CDNs. Moreover, the computer system 100 can include and/or be in communication with an IP lookup database through which the computer system 100 can get geographical and/or identifying information for the user device. Furthermore, the computer system 100 can interface directly or indirectly with the user device to gather or receive data regarding the user device configuration, performance, streaming parameters, etcetera.

As shown in FIG. 4, a viewer/user may access the AV segment as rendered within a local browser application on a user device, such as a computer, laptop computer, smart phone, tablet, specialized video streaming hardware/software, etcetera. Generally, the user may access the AV segment as a streamable AV segment, as transcoded and delivered by the computer system 100 to the user device through a CDN and viewable on the user device through an AV player (either standalone application or embedded within a browser).

2.2 Applications

Generally, the computer system 100 can execute Blocks of the method S100 to optimize the generation, processing, distribution, and viewing of AV content through a distributed set of CDNs. Commercial services test the availability and efficiency of CDNs by causing the CDNs to receive and distribute small data streams, most of which are too small to deliver any relevant information that indicates a CDN's ability to receive and distribute AV content. As described in more detail below, the example implementations of the computer system 100 are configured to execute the method S100 to: measure an effectiveness of a CDN for video-specific streaming performance; select an optimal CDN for streaming video to a user device; and transition between CDNs for a set of user devices as streaming performance and/or operating conditions change.

As described below, the computer system 100 executes Blocks of the method S100 to accumulate and aggregate CDN-specific data from each CDN in a set of CDNs at each request or PoP. The computer system 100 can further aggregate or organize the CDN data into an historical database of CDN performance for each CDN in the set of CDNs. The computer system 100 is further configured to augment or enrich the CDN-specific data with AV content streaming specific data acquired or received by the computer system 100 in its receipt, transcoding, and distribution of AV content. Generally, the historical data relating to CDN performance is out of sync and aperiodic with the AV content streaming data received at the computer system 100. For example, the historical CDN datasets can track over hours, days, or weeks, while the AV content streaming data can be received in real-time or near real-time from the set of user devices. Accordingly, the computer system 100 can be configured to continuously or intermittently update or refresh the enriched data set with current AV content streaming data updating and/or amending the CDN log data.

Generally, the computer system 100 can therefore: characterize an historical performance of a CDN within a set of CDNs; contextualize the historical performance of the CDN within the set of CDNs with AV content streaming specific data; and determine or quantify an expected performance of each CDN within the set of CDNs based on AV content streaming parameters, user device requests/requirements, and geographical limitations or advantages for each CDN-user device-AV content triplet. For each user device and each streaming request, the computer system 100 can prospectively rank available CDNs based upon expected AV content streaming performance and direct each user device to the most favorable (least latency) CDN in the set of CDNs for the particular streaming event that the user device has requested.

In operation, the computer system 100 can receive multiple synchronous or substantially synchronous requests from user devices located in varying regions, continents, or countries. The computer system 100 can execute Blocks of the method S100 to receive each request, asynchronously lookup the location and identification of each requesting user device, rank available CDNs for each requesting user device, and transmit instructions and/or directions for each user device to connect to the most appropriate CDN for receipt of the streaming AV content. Additionally, the computer system 100 can execute these Blocks of the method S100 while generating a manifest for the requested AV content. Therefore, the computer system 100 can stream the selected AV content through the selected CDN to each requesting user device in real-time or substantially real-time such that the user experiences seamless requesting and viewing of the selected AV content.

As described in detail below, the computer system 100 can be further configured to dynamically adjust CDN rankings based upon: changes in the state of a CDN (e.g., CDN outage or connectivity issues); changes in the configuration of the user device (e.g., streaming in motion or static streaming); or a new request from the user device for additional or different AV content (e.g., streaming a movie trailer to streaming the full movie). In one variation of the example implementation, the computer system 100 can generate and transmit a ranked list of CDNs to each user device such that each user device can autonomously or automatically direct itself to the best available (lowest latency) CDN in response to changes in CDN performance, user device configuration, or requested AV content.

2.3 Terminology

Generally, the computer system 100 and method S100 are described herein with respect to AV content, AV segments, and streaming parameters. The term "AV content" refers to a static AV file uploaded to a cache maintained by the system or a dynamic AV livestream that is cached in an original rendition. The term "AV segment" (e.g., an HLS or LL-HLS segment) refers to a set of frames of the AV content (i.e., a Group of Pictures) including an I-frame, which the system can transcode independently of other segments of the AV file. The computer system 100 can store each AV segment as a separate file within a "playlist" for delivery to an AV player (e.g., standalone AV player application or browser-embedded AV player) via a CDN. The term "streaming parameters" refers to a set of controls implementable by the system to modify, change, adapt, and/or schedule storage, access, transcoding, compression, scheduling, and/or distribution of an AV segment.

Generally, a "rendition" of an AV segment, as referred to herein, defines a quality level, a combination of a bitrate and a resolution (i.e., a bitrate-resolution pair), for the AV segment. Additionally or alternatively, a rendition can define a format, codec, or version (e.g., an audio only version) of the AV segment. Therefore, the computer system 100 can transcode an AV segment from an original rendition (or mezzanine version) of the AV segment to another rendition prior to delivery to a requesting AV player to enable timely transmission of the AV segment to an AV player for playback by the AV player.

The computer system 100 is configured to just-in-time transcode and/or store multiple renditions of a single AV segment other than the original rendition to enable AV players to request a rendition that matches the viewing conditions (e.g., mobile viewing over a cellular network, static viewing on a large display) of the AV player via adaptive bitrate streaming technology. The computer system 100 can receive requests for AV segments or byterange-addressable parts of AV segments in any rendition advertised to the AV player. Generally, the computer system 100 can just-in-time transcode an AV segment or byterange-addressable part into a rendition currently requested by an AV player. Additionally, the computer system 100 can predict byterange-addressable part sizes for AV segments based on a "target rendition" for the AV segment in order to account for differences in part sizes between higher-quality and lower-quality renditions of an AV segment.

2.4 CDN Log

As shown in FIG. 1, the computer system 100 can execute Block S210 of the method S100 for selection and management of a content delivery network (CDN) by generating a CDN log including distribution data from a CDN within a set of CDNs. Generally, the computer system 100 can be connected to and/or connectable to a set of CDNs distributed globally across regions and time zones. Each CDN in the set of CDNs can be configured to distribute digital content to end users via the internet and using internet data transmission protocols. As noted above, each CDN can measure its own performance, uptime, downtime, throughput, and/or latency based upon selected transmission of relatively small files and/or data packets. The computer system 100 can then receive, from each CDN in the set of CDNs, a measure of performance or latency for the transmission of test files and/or real distributed files. Furthermore, the computer system 100 can aggregate, assemble, or generate a CDN log including distribution data for each CDN in the set of CDNs that includes data and/or characterizations regarding the performance of each CDN the set of CDNs.

Generally, the computer system 100 can be configured to update and/or modify the CDN log in response to outages or interruptions at a CDN in the set of CDNs. Additionally or alternatively, the computer system 100 can be configured to periodically or intermittently update and/or modify the CDN log at defined intervals, such as once per 24-hour period, or once per 24-hour period per time zone (e.g., rolling updates through the entire set of CDNs).

As shown in FIG. 1, the computer system 100 can execute Block S220 of the method S100 by accessing a streaming performance data set, including data internal to or connected to the computer system 100 and relating to video-specific streaming performance. For example, the streaming performance data set can include: metrics such as an overall viewing performance score, number of playback failures, time to first frame, number of exits before video start, player load time, page load time, rebuffer percentage, rebuffer frequency, seek time, upscale percentage, and downscale percentage. Additionally, the streaming performance data set can include device/location contextual data including for example: browser type, browser version, country, operating system, OS version, player name, player version, player software, player source type, source hostname, stream type, video title, video series, and content source. Further, the streaming performance data set can include: hardware, network, and site or owner-specific data such as CPU and motherboard identity, operating frequency, connection type (e.g. wired or wireless), connection speed, packet drop or loss metrics, IP address, ISP, geographic location, and owner identity.

As shown in FIG. 1, the computer system 100 can execute Block S230 of the method S100 by augmenting the CDN log with the streaming performance data set to generate an enhanced CDN log, resulting in a more complete understanding of the historical performance of a selected CDN within the set of CDNs with respect to video-specific streaming performance. As noted above, one measure of historical CDN performance is generated through the test transmission of small data sets or packets. Accordingly, the computer system 100 can augment historical CDN performance data with video-specific streaming performance metrics more effectively and more efficiently compute, determine, and/or select the best or optimal CDN for video streaming via the computer system 100 and associated video streaming platform.

As shown in FIG. 1, the computer system 100 can execute Block S240 of the method S100 by receiving a request from a user device to stream video from the computer system 100 to the user device via the CDN. Generally, a user request will come from a video player application or module associated with a user device (e.g., phone, tablet, laptop, streaming television appliance, etcetera) to the computer system 100 either directly or through the CDN currently in use. In one variation of the example implementation of the method S100, the user device request can include: a resolution, aspect ratio, audio sample rate, audio encoding, and video encoding for a given bandwidth and screen size.

As shown in FIG. 1, the computer system 100 can execute Block S250 of the method S100 by associating an autonomous system number (ASN) with the user device defining a geographical location of the user device. Generally, CDNs are located in specific regions around the world, and may have increased or decreased performance depending upon location, time of day, infrastructure reliability, network traffic, etcetera. For example, in a given region, CDN performance or reliability may be higher during times during which the bulk of the resident population is asleep or at work. Conversely, in the same region, CDN performance or reliability may be lower during peak internet traffic times of the day, such as evenings and weekends when the population may be streaming movies or sporting events. Similarly, natural disasters, weather events, and international relations can affect the performance or reliability of a CDN during times of high internet usage, low electricity availability, or infrastructure interruptions or challenges.

Accordingly, the computer system 100 can geolocate a user device via accessing and/or interfacing with an IP address lookup service, a geographic IP address database, and an Autonomous System Network (ASN) database that maps IPv4 and IPv6 addresses to ASN. Furthermore, the computer system 100 can update the ASN database with Border Gateway Protocol prefix information. As described herein, the computer system 100 can factor the geolocation of the user device in identifying an optimal CDN based in part upon the region in which the user device is located. For example, if the user device requests a video stream at a peak internet usage time for its location, then an optimal CDN may be located outside of the surrounding region. Conversely, if the user device requests a video stream at a relatively low internet usage time for its location, then a local or regional CDN may be able to provide lower latency AV content streaming service.

2.5 CDN Selection

As shown in FIG. 1, the computer system 100 can execute Block S260 of the method S100 by accessing the enhanced CDN log to determine a lowest latency CDN in the set of CDNs. Generally, the computer system 100 can determine a lowest latency CDN based upon the IP and/or geolocation of the user device and the enhanced CDN log (e.g., including video-specific streaming data). For example, the computer system 100 can, for a given location and/or time of the request from the user device, look up a lowest latency CDN within the enhanced CDN log, such as a CDN having the lowest latency over the past twenty-four-hour period.

Alternatively, the computer system 100 can be configured to look up at lowest latency CDN over a shorter time interval, for example on the order of minutes or synchronously with an ingestion pipeline of video content to be delivered to the user device. For example, if the time interval between ingestion of an initial rendition of a video segment at the computer system 100 and delivery of a second rendition of the video segment is approximately five minutes, then the computer system 100 can be configured to look back through the enhanced CDN log in (approximately) five-minute intervals to assess the near real-time performance of the CDNs in the set of CDNs.

In one variation of the example implementation, the computer system 100 can aggregate requests from a set of user devices to determine a lowest latency CDN. For example, the computer system 100 can build or generate a running aggregation of current requests from a set of user devices and then rank or prioritize the aggregation of current requests against a current list or aggregation of lowest latency CDNs. The computer system 100 can then pair each request within the aggregation of current requests with a CDN selected from the aggregation of lowest latency CDNs. For example, the computer system 100 can pair user device requests with CDNs using random assignment, round robin assignment, video streaming performance optimization assignment, or by implementing machine learning techniques to select and pair CDNs with appropriate requests to maximize or optimize the performance of the computer system 100.

In another variation of the example implementation, the computer system 100 can aggregate different types of requests from a user device to determine a lowest latency CDN. For example, if a user device transmits a series of requests, each having distinct or differentiated streaming requirements, the computer system 100 can assign each type of request to a different CDN that is operating at an appropriate latency associated with the inbound request. Alternatively, the computer system 100 can aggregate a series of requests by a single user device (e.g., over a period of days, weeks, months), and generate an aggregated or normalized request that is representative of the video streaming habits of the user device. In this variation of the example implementation, the computer system 100 can then pair the user device with a CDN selected for optimal latency and performance for the aggregated or normalized requests associated with the user device. For example, if the user device transmits a request at roughly the same time each day to stream a video (e.g., a television show), then the computer system 100 can automatically associate the user device with an established latency requirement and thereby (provisionally) assign the user device to a selected CDN that historically performs reliably at the selected time and with the required latency.

In yet another variation of the example implementation, the computer system 100 can balance or weight a number of requests with a normative latency for each CDN in the set of CDNs in order to determine a lowest latency CDN for any particular request. For example, the computer system 100 can receive a set of requests from a set of user devices with each request including a different set of media and a unique set of streaming parameters. The computer system 100 can balance each request within the set of requests against a determined or calculated latency for a subset of CDNs within the set of CDNs such that higher latency requests get paired with higher latency CDNs and lower latency requests gets paired with lower latency CDNs.

As shown in FIG. 1, the computer system 100 can execute Block S270 of the method S100 by transmitting a URL associated with the lowest latency CDN to the user device. For example, the computer system 100 can transmit a message including the specified URL to the user device such that the player/browser associated with the user device can readily begin communicating with the lowest latency CDN and streaming the requested video content.

Generally, the computer system 100 can execute Blocks S210 through S270 with low latency such that the user device is directed to the lowest latency CDN with little or no lag or disruption in the user experience. For example, the user device can send an initial request to an initial CDN and the initial CDN can pass the initial request through to the computer system 100. The computer system 100 can then execute Blocks S210 through S270 in a time interval that appears instantaneous or substantially instantaneous to the user associated with the user device. In one variation of the example implementation, the computer system 100 can execute Blocks S210 to S270 of the method S100 in a time interval ranging between 0.001 seconds and 5 seconds. In another variation of the example implementation, the computer system 100 can execute Blocks S210 to S270 of the method S100 in a time interval ranging between 5 seconds and 10 seconds. In yet another variation of the example implementation, the computer system 100 can execute Blocks S210 to S270 in a time interval exceeding 10 seconds.

2.6 User Device Based Selection

In one variation of the example implementation of the method S100, the computer system 100 can transmit a ranked list of CDNs to the user device such that the user device can autonomously select a lowest latency CDN in response to changes in the latency of the CDNs identified in the ranked list of the CDNs. Generally, the user device can be configured to repeatedly transmit requests to the hosting CDN (and the computer system 100) even while streaming video content from the computer system 100 and through the CDN. Accordingly, rather than repeatedly executing Blocks S210 through S270 of the method S100, the computer system 100 can transmit a ranked list of CDNs (and associated URLs) to the user device such that, in case of interruption or decreased performance, the user device can autonomously and automatically select the next lowest latency CDN in the ranked list.

In another variation of the example implementation of the method S100, the ranked list can include a ranked list of CDNs (and associated URLs) as well as an electronic instruction to send a new request to the computer system 100 upon reaching the end of the ranked list. For example, the computer system 100 can transmit a ranked list of five CDNs to the user device at a first time. The user device can then: select an initial and subsequent CDN in series based upon the ranked list of CDNs along with an instruction to transmit a follow-up request to the computer system 100 upon reaching the fifth of five ranked CDNs. Upon receipt of the follow-up request, the computer system 100 can execute Blocks of the method S100 described above to generate a second ranked list of CDNs and transmit the same to the user device at a second time.

Alternatively, the ranked list can include a ranked list of CDNs (and associated URLs) as well as an electronic instruction to send a new request to the computer system 100 upon passage of a set time interval (e.g., minutes, hours, days), at which time the computer system 100 can execute Blocks of the method S100 to generate and transmit a second ranked list of CDNs to the user device. For example, the ranked list can include the ranked list of CDNs and instructions for the user device to transmit a new request for the computer system 100 at the beginning of each day, for example at 12:01 local time at the user device. Alternatively, the ranked list can include the ranked list of CDNs and instructions for the user device to transmit a new request for the computer system 100 each calendar day at a specified time, for example at the predicted or measured onset of peak/valley streaming time at the local time of the user device (e.g., at an expected peak of 19:00 local time at the user device).

In yet another variation of the example implementation, the computer system 100 can autonomously update and/or retransmit the ranked list of CDNs to the user device in response to: receiving notice that a CDN listed in the first ranked list is offline or not performing well; or receiving notice that a previously offline or underperforming CDN has come back online and should be included on the ranked list of lowest latency CDNs. Moreover, the computer system 100 can autonomously update and/or retransmit the ranked list of CDNs to a set of user devices affected by a change in the state of a CDN or set of CDNs.

For example, a first CDN in the Eastern United States time zone may become overwhelmed upon arrival of the primetime internet usage and video streaming hours. Accordingly, the computer system 100 can automatically update and retransmit the ranked list (or lists) and replace the first CDN with a second CDN located in a Western or European locale where expected internet traffic will be considerably lower. As noted above, the computer system 100 can perform the foregoing techniques and methods for each affected CDN and for each user device in the set of user devices that received a ranked list including the affected CDN.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    during a first time period:
        receiving a first request for video content from a first user;
        generating a first fingerprint of the first user;
        accessing a first set of historical metrics for a first user population assigned to a first content delivery network;
        accessing a second set of historical metrics for a second user population assigned to second content delivery network;
        based on the first set of historical metrics, calculating a first metric associated with distribution of the video content from the first content delivery network;
        based on the second set of historical metrics, calculating a second metric associated with distribution of the video content from thesecond content delivery network; and
        in response to the first metric exceeding the second metric, assigning the first user to the first content delivery network; and
    during a second time period:
        accessing a first set of data, from the first content delivery network, for distribution of the video content to the first user population during the first time period;
        accessing a second set of data, from the second content delivery network, for distribution of the video content to the second user population during the first time period:
            based on the first set of data, calculating a third metric associated with distribution of the video content by the first content delivery network; and
            based on the second set of data, calculating a fourth metric associated with distribution of the video content by the second content delivery network;
        updating the first set of historical metrics with the third metric and the second set of historical metrics with the fourth metric; and
        in response to the fourth metric exceeding the third metric by more than a threshold difference, reassigning the first user to the second content delivery network.

2. The method of claim 1, further comprising, during an intermediate time period between the first time period and the second time period:
    accessing the first set of historical metrics for the first user population assigned to the first content delivery network;
    accessing the second set of historical metrics for the second user population assigned to the second content delivery network;
    based on the first set of historical metrics, calculating a fifth metric associated with the first user streaming the video content from the first content delivery network;
    based on the second set of historical metrics, calculating a sixth metric associated with the first user streaming the video content from the second content delivery network; and
    in response to the sixth metric exceeding the fifth metric by less than the threshold difference, maintaining the first user at the first content delivery network.

3. The method of claim 1:
    wherein calculating the first metric comprises calculating the first metric in response to receiving the first request forthe video content from the first user;

wherein calculating the second metric comprises calculating the second metric in response to receiving the first request for the video content from the first user;
wherein calculating the third metric comprises calculating the third metric in response to:
  detecting that a time elapsed from a last metric calculation exceeds a threshold duration;
  detecting streaming errors within the video content streamed by the first user; and
  detecting a first latency increase of the first content delivery network; and
wherein calculating the fourth metric comprises calculating the fourth metric in responseto:
  detecting that a time elapsed from the last metric calculation exceeds thethreshold duration;
  detecting streaming errors within the video content streamed by the first user; and
  detecting a second latency increase of the second content delivery network.

4. The method of claim 1, further comprising
during the first time period:
  associating the first user with the first user population based on the first fingerprint, the first user population assigned to the first content delivery network and receiving the video content from the first content delivery network during the first time period;
during the second time period selecting a second user within the first user population; and
in response to the fourth metric exceeding the third metric, reassigning the second user to the second content delivery network.

5. A method comprising:
at a first time within a first time period:
  receiving a first request for video content from a first device;
  generating a first fingerprint for the first device based on a first geolocation and a first characteristic of the first device;
  associating the first device with a first set of devices based on the first fingerprint, the first set of devices assigned to a first content delivery network and receiving the video content from the first content delivery network during the first time period; and
  for each device in the first set of devices:
    accessing a first error rate of the video content distributed from the first content delivery network;
    accessing a first buffer fill rate of the video content distributed from the first content delivery network; and
    accessing a first bitrate of the video content distributed from the first content delivery network;
  based on the first error rate, the first buffer fill rate, and the first bitrate of each device in the first set of devices, calculating a first metric for distribution of the video content from the first content delivery network; and
at a second time within the first time period:
  selecting a second device, associated with a second fingerprint, within the first set of devices;
  generating the second fingerprint of the second device based on a second geolocation and a second characteristic of the first device;
  identifying a second content delivery network distinct from the first content delivery network;
  reassigning the second device to the second content delivery network; and
  accessing a second error rate of the video content distributed from the second content delivery network to the second device;
  accessing a second buffer fill rate of the video content distributed from the second content delivery network to the second device;
  accessing a second bitrate of the video content distributed from the second content delivery network to the second device; and
  based on the second error rate, the second buffer fill rate, and the second bitrate, calculating a second metric for distribution of the video content from the second content delivery network; and
in response to the second metric exceeding the first metric and in response to a distance between the first geolocation and the second geolocation falling below a threshold distance, reassigning the first deviceto the second content delivery network.

6. The method of claim 5:
wherein generating the first fingerprint comprises generating the first fingerprint for the first device associated with a first user;
wherein selecting the second device comprises selecting the second device associated with the first user; and
further comprising:
  at a third time within the first time period:
    reassigning the second device to a third content delivery network;
    accessing a fourth metric for distribution of the video content from the third content delivery network to the second device;
    accessing a fifth metric for distribution of the video content from the second content delivery network to the first device;
    selecting a third device within the first set of devices, the third device associated with a second user different from the first user; and
  in response to the fourth metric exceeding the fifth metric and the second metric, reassigning the third device to the third content delivery network.

7. The method of claim 6:
wherein generating the first fingerprint for the first device comprises:
  identifying the first characteristic of the first device asa first operating system;
  identifying the first geolocation of the first device as a first geographic region; and
  generating the first fingerprint forthe first device based on the first operating system and the first geographic region; and
wherein generating the second fingerprint for the second device comprises:
  identifying the second characteristic of the second device as a second operating system;
  identifying the second geolocation of the second device as the first geographic region; and
  generating the second fingerprint forthe second device based on the second operating system and the first geographic region.

* * * * *